United States Patent [19]

Galluzzo et al.

[11] Patent Number: 4,457,816
[45] Date of Patent: Jul. 3, 1984

[54] ELECTROLYSIS METHOD FOR DECOMPOSING WATER INTO HYDROGEN GAS AND OXYGEN GAS

[75] Inventors: Daniel T. Galluzzo, Jarrettsville, Md.; Charles L. Dumler, Kent, Washington

[73] Assignee: Hydor Corporation, Baltimore, Md.

[21] Appl. No.: 458,715

[22] Filed: Jan. 17, 1983

Related U.S. Application Data

[63] Continuation of Ser. No. 210,336, Nov. 25, 1980, Pat. No. 4,369,102.

[51] Int. Cl.³ ............... C25C 1/00; C25B 1/06; C25B 11/02; C02F 1/46
[52] U.S. Cl. .............. 204/105 R; 204/129; 204/149; 204/228; 204/270; 204/280
[58] Field of Search .......... 204/129, 105 R, 270, 204/228, 266, 258, 149, 280

[56] References Cited

U.S. PATENT DOCUMENTS

| | | | |
|---|---|---|---|
| 1,380,835 | 5/1921 | Boisen | 204/278 |
| 1,401,035 | 12/1921 | Boisen | 204/278 |
| 3,394,062 | 7/1968 | Rhodes | 204/129 |
| 3,645,880 | 2/1972 | Ueda | 204/270 X |
| 4,002,553 | 1/1977 | Arntz | 204/278 |
| 4,023,545 | 5/1977 | Mosher et al. | 204/129 X |
| 4,061,555 | 12/1977 | Miyantani et al. | 204/278 X |
| 4,078,985 | 3/1978 | Takeuchi | 204/129 X |
| 4,193,858 | 3/1980 | Loeffler, Jr. | 204/270 X |
| 4,202,744 | 5/1980 | Pan et al. | 204/129 |
| 4,211,620 | 7/1980 | Fowler | 204/278 X |
| 4,235,693 | 11/1980 | Rowe et al. | 204/129 |
| 4,235,694 | 11/1980 | Hall | 204/129 X |

Primary Examiner—Donald R. Valentine
Attorney, Agent, or Firm—Leonard Bloom

[57] ABSTRACT

An electrolysis apparatus decomposes water into hydrogen gas and oxygen gas. The apparatus comprises a housing for the water to be decomposed, a plurality of symmetrically folded and edged unipolar electrodes for decomposing the water held in the housing, microporous membranes for separating each of the plurality of unipolar electrodes from one another, and an arrangement for wiring the plurality of unipolar electrodes in parallel. The apparatus also comprises separate outlets, collectors, and consumers for each gas. There is also a water supply, a water feed regulator, and a water inlet. A power source supplies electrical wattage to the parallel wiring arrangement. An electrolytic solution containing only about 2.2% or less KOH concentration by weight is used to help decompose the water. Invertible plates may be used either for diverting the free upward flow of hydrogen gas and oxygen gas laterally to separate gas outlets or for diverting the free downward fall of minerals laterally to a collection chamber.

13 Claims, 11 Drawing Figures

ELECTROLYSIS METHOD FOR DECOMPOSING WATER INTO HYDROGEN GAS AND OXYGEN GAS

This application is a continuation of application Ser. No. 210,336 filed Nov. 25, 1980, U.S. Pat. No. 4,369,102.

BACKGROUND OF THE INVENTION

1. Field of the Invention

This invention relates to an electrolysis method and apparatus, and in particular, to an electrode and a diaphragm arrangement for the synthesis of hydrogen and oxygen gases from an aqueous bath.

2. Description of the Prior Art

It is a problem in electrolysis technology to maintain a high production of hydrogen and oxygen gases from water cheaply and efficiently. A number of both unipolar and bipolar electrode arrangements have been developed and tested.

Unipolar electrodes are used in Stuart cells and are basically covered by U.S. Pat. No. 1,941,816. They are exemplified by those commercially available from the Electrolyzer Corporation of Canada. However, they are flat plates limited to a single planar expansion in height and width, wire connections to a single side of the electrode, electrolytic concentrations of 25 to 38% potassium hydroxide (KOH) by weight, a pressurized system, high ohmic resistance, utilization of only distilled feed water, massive permanent structures, and coolant water circulating at about sixty gallons per hour per one hundred cubic feet of gas production.

A relatively thick electrode corrugated on only one side is known from U.S. Pat. Nos. 4,056,452 and 4,057,479. However, this electrode is bipolar, requires high voltages, and is limited to the use of distilled or chlorinated water. Its only perceived advantage is an attempted increase of electrode surface in contact with the water being processed. Otherwise, this type of electrode has the same disadvantages as the Stuart cell electrode.

An electrode having transverse undulations on both its side surfaces is known from French Pat. No. 987,879. However, this electrode is also bipolar and requires high voltages. There is only a demonstration of enhancing the internal circulation of the electrolyte in the housing compartment. Furthermore, there is no discussion of any parallel wiring arrangement. Likewise, the electrode plates are separated from each other and are arranged "point-to-point" so that there is no possibility that the undulations of one electrode may intermesh and be evenly spaced from the undulation of an adjacent electrode.

A plurality of separators having undulations on both sides and being evenly spaced from each other is known from U.S. Pat. No. 3,384,568. However, the electrodes are specifically disclosed as cord-like and there is no suggestion that they may be made in the same manner as the separators. In fact, making the electrodes in such an undulated manner would be contrary to the entire thrust of the invention which is believed to reside in the cord-like shape of the electrodes.

A plurality of electrodes having undulations on both sides and being evenly spaced from each other is known from West German Offenlegungsschrift No. 29 06 821. However, the electrodes are bipolar and again there is no discussion of any parallel wiring arrangement. Furthermore, the undulations are wavy and not marked by sharp folds and edges. Additionally, the separators are arranged so that the undulations of the electrodes are prevented from intermeshing from each other.

Therefore, it remains a problem to develop and commercially exploit an electrolysis apparatus which is capable of maintaining a high production of hydrogen and oxygen gases by decomposing water both cheaply and efficiently.

SUMMARY OF THE INVENTION

The present invention relates to an electrolysis apparatus which is capable of maintaining a high production of hydrogen and oxygen gases by decomposing water both cheaply and efficiently.

A primary object of the present invention is to eliminate the need for excessively heavy and oversized housings for electrolysis apparatus.

It is another primary object of the present invention to eliminate the need for electrodes made of precious metals.

It is a further object of the present invention to eliminate the need for high voltage cables and heavy gauge wiring. Such cables and wiring are utilized in series arrangements of electrodes and usually produce large amounts of waste heat.

It is also an object of the present invention to reduce the percentage concentration of electrolyte in the aqueous bath. Since electrolytes are usually heated and pressurized before being forced into prior art devices, the elimination of the need for such heating and pressurizing is a concomitant object of the invention.

It is also an object of the invention to eliminate the need for accessories, such as circulatory equipment for the electrolytic solution, coolant pumps, and fans.

Likewise, it is an object of the invention to eliminate the need for an initial purging of the electrolysis apparatus by an inert gas and the need for an initial filtering of feed water to the apparatus.

These objects and other advantages accomplished by the present invention will become clear from the following description of the various embodiments of the invention.

DETAILED DESCRIPTION OF THE PREFERRED EMBODIMENTS

Figure 1:
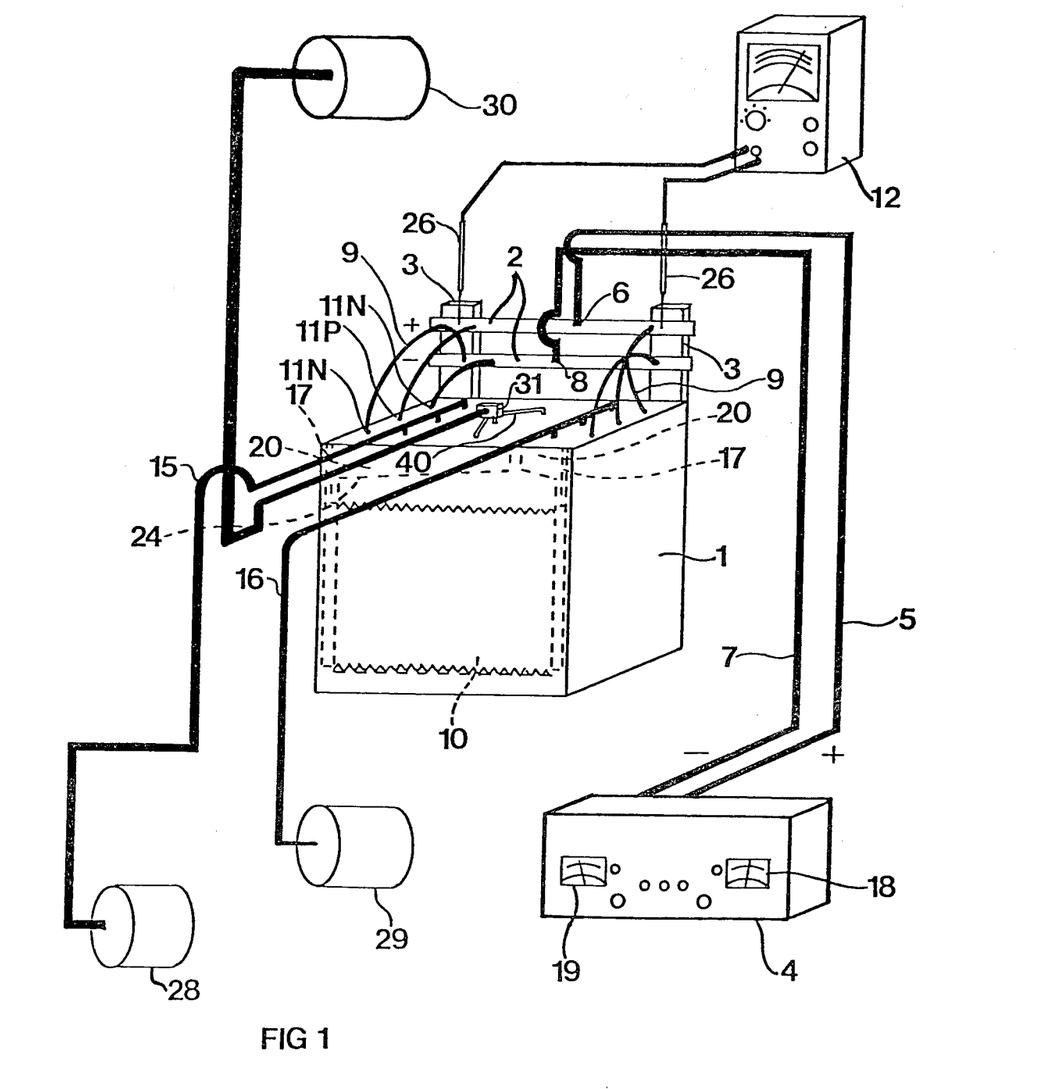
FIG. 1 is a schematic view of a first embodiment of the present invention for the production of gas only.

As shown in FIG. 1, an outer housing or compartment 1 is constructed of non-corrosive, low electroconductive, highly insulative material, such as one-quarter inch thick plexiglas. The housing 1 is small, lightweight, and easily portable by only one person.

A bus bar 2 may be made of any electroconductive material, such as steel, iron, copper, or aluminum, but must not be attached to any other conductive material. It is preferred to mount the bus bar 2 on a nonconductive backing sheet 3, made out of plexiglas or porceleinized material, which is attached or otherwise forms a part of the outer housing 1.

The function of the bus bar 2 is to receive d.c. current from a power source or supply 4. The power source 4 may be any device capable of producing d.c. current, such as a battery charger, a standard auto battery, a photovoltaic cell which takes sunlight and converts it into d.c. current, or a d.c. transformer like those manufactured by the Hewlitt-Packard Corporation. An amp meter 18 and a volt meter 19 may be a part of the power source 4, as shown in FIG. 1, or may be separated therefrom. Theoretically, water at 30° C. (86° F.) disassociates into hydrogen gas and oxygen gas when about 1.23 volts is applied to it. However, the practical range at which disassociation occurs has been found to be 1.9 to 2.6 volts. The applied voltage preferred for the present invention is a constant 2.0 volts. The preferred amperage is about 4.0 amps so that the wattage being applied per electrical field by the power source 4 is approximately 8.0 watts. One electrical field, of course, constitutes a positive and a negative electrode for producing oxygen and hydrogen gas, respectively.

In prior art devices, it is necessary to purge oxygen out of the entire system before beginning operation because hydrogen produced in an oxygen-laden environment is extremely volatile in such high-temperature operations. Such purging is usually accomplished with a relatively expensive inert gas, such as argon. In the present invention, no purging is required because the device operates at room temperature and there is not sufficient heat generated to create a volatile atmosphere.

A positive cable 5 leads from the power source 4 and is attached to a positive side 6 of the bus bar 2. A negative cable 7 also leads from the power source 4 but is attached to a negative side 8 of the bus bar 2.

The bus bar 2 distributes d.c. current to a number of wires 9 leading eventually to a plurality of unipolar electrodes 10 aligned in a parallel array inside the housing 1. This wiring arrangement differs from prior art devices which are usually wired in series and which require separate power sources for each electrode. This parallel arrangement of the present invention allows the power source 4 to supply about two volts each to an unlimited number of unipolar electrodes 10.

When sea or chlorinated water instead of distilled water is being decomposed, there is no production of deadly chlorine gas because the voltage input is not high enough to disassociate the salt dissolved in the water into chlorine gas molecules.

Figure 2:
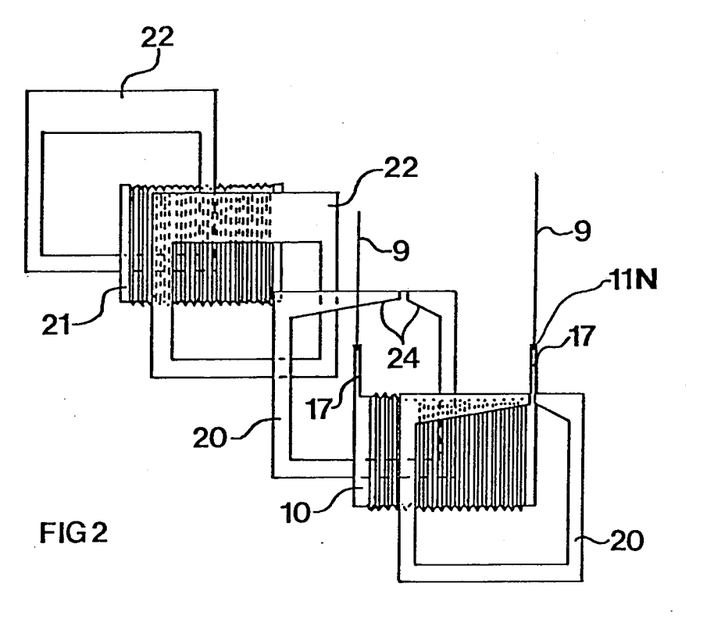
FIG. 2 is an exploded view of the first embodiment of utilizing an arrangement of a symmetrically folded and edged unipolar electrode and a symmetrically folded and edged separator.

Also, because of this low voltage which is constantly supplied by the power source 4, it is necessary to utilize only thin gauge wire for wires 9. There is no need for the heavy gauge, high voltage, insulated wires used in prior art devices. Such thin gauge wires 9 may be THHN, i.e., 19 strand, 12-gauge copper wire, similar to that used for auto ignition wiring and for high fidelity stereo wiring. As best shown in FIG. 2, wires 9 are attached to both ends of flat tabs 17 along edges of unipolar electrodes 10 by soldering, by alligator clips, by bolting, or by standard electronic connectors 11N and 11P. As shown in FIG. 1, connectors 11N join wires 9 leading from the negative side 8 of the bus bar 2 to the tabs 17 shown in phantom lines for negative electrode plates 10. Likewise, connectors 11P join wires 9 leading from the positive side 6 of bus bar 2 to the tabs 17 for positive electrode plates 10. The connection of wires 9 to tabs 17 of any electrode 10 is made outside of housing 1 in order to avoid the possibility of arcing and/or shorting which may be caused by the corrosive build-up of either electrolyte or aqueous impurities around the connectors 11N and 11P if such connectors 11N and 11P were maintained constantly in the aqueous bath. Furthermore, such outside connections facilitate the installation, maintenance, and replacement of wires 9 and connectors 11N and 11P.

One reason for the attachment of wires 9 to both ends of each unipolar electrode 10 is that a more even distribution of current is permitted throughout each electrode 10.

Another reason for such attachment of wires 9 to each electrode 10 is that monitoring of each electrode 10 is allowed by an ohmic multi-tester 12, such as the type manufactured by Simpson Industries. This monitoring is done in order to detect any defect in a single electrode 10 while the entire production unit is operating. The monitoring is accomplished by having the multi-tester 12 measure the ohmic resistance of each electrode 10 in order to determine if current is indeed capable of passing therethrough. Thus, a defective electrode will be detected because it carries a reduced or zero electrical charge. Therefore, the defective electrode or any other electrical connection thereto may be removed. A greater degree of quality control will thus be maintained. The monitoring is done by disconnecting wires 9 from both ends of an individual electrode 10 at the bus bar 2 and contacting probes 26 with wires 9 in order to ascertain that the individual electrode 10 is, in fact, capable of carrying a full electrical charge.

In prior art devices, wire connections are made at only one end of an electrode or to a longitudinally folded metal current distributor. Such an arrangement does not permit the detection and segregation of a single defective electrode. In such prior art devices, it is necessary to stop total production of hydrogen and oxygen gases in order to detect, locate, and service the one defective electrode. This inconvenience occurs because the monitoring device can be attached only to the power source supplying current to the complete system of electrodes arranged in series and, therefore, it can only determine if the entire system is operating at full capacity.

Figure 3:
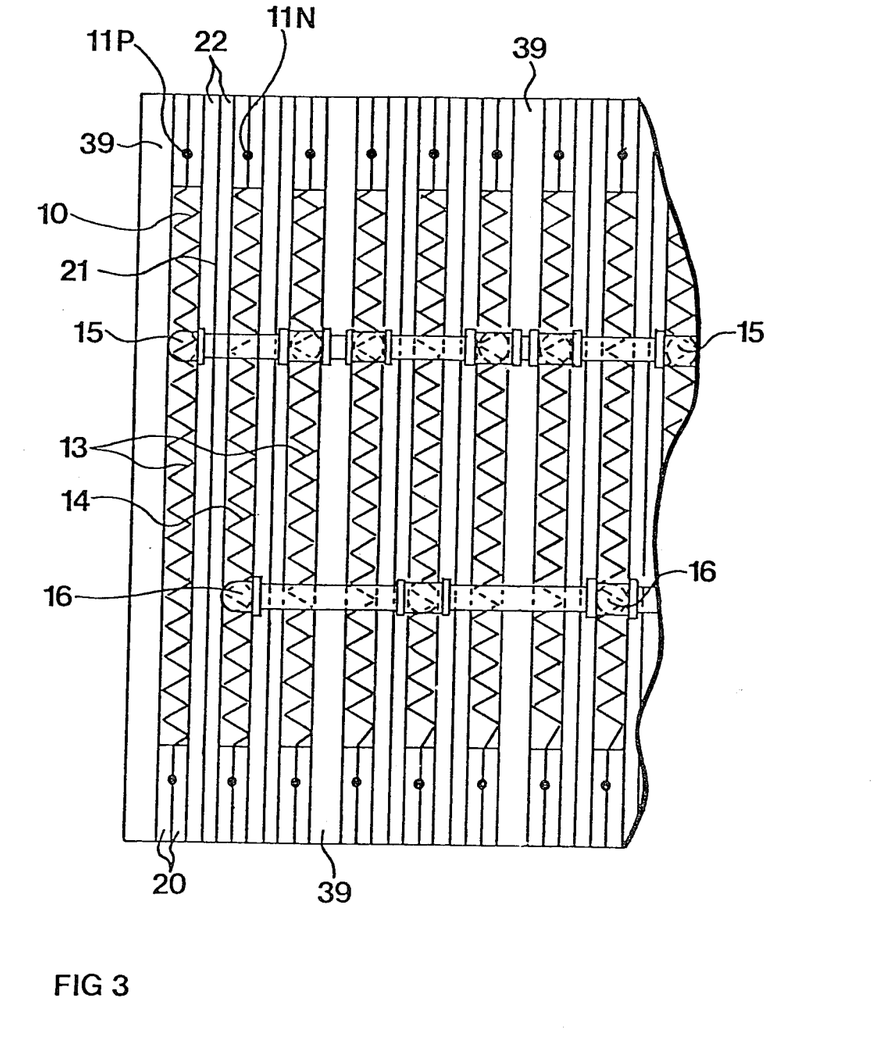
FIG. 3 is a top plan view of the first embodiment having a modified arrangement of a plurality of symmetrically folded and edged unipolar electrodes and a plurality of interspaced planar separators.

The electrodes 10 are unipolar. This means that, as best seen in FIG. 3, there are positive electrode plates 13 for receiving a direct positive electrical charge and there are negative electrode plates 14 for receiving a direct negative electrical charge. To the contrary, in prior art devices, electrodes in electrolysis apparatus are bipolar and have one face which acts as an anode surface and an opposite face which acts as a cathode surface when an electric current is passed therethrough. See McGraw-Hill Dictionary of Scientific and Technical Terms 180 (2d ed. 1978). Such bipolar electrodes require high voltages in order to distribute electrical current from one to the other end of the electrode so that hydrogen and oxygen gases will be produced at opposite faces of the same electrode.

Each electrode 10 of the present invention may be made of relatively inexpensive stainless steel or another noncorrosive alloy containing nickel-chromium (NiCr), such as a tool wrapping sheet being 0.002 millimeters thick. For the production of only hydrogen and oxygen gases from ordinary tap water, this tool wrapping is a very suitable material. However, for the production of minerals from sea water, a stainless steel alloy of high electroconductivity would be more suitable.

In the electrolysis apparatus utilized to carry out the present invention, the housing 1 contains a plurality of electrodes 10. As best seen again in FIG. 3, there may be a plurality of housings 1 arranged adjacent to each other. Each housing 1 preferably carries a group of three electrode plates. However, a group of more than three, for example, fifteen, electrode plates may be carried in a single housing 1. Two positive electrode plates 13 produce oxygen gas on both sides while an intermediate negative electrode plate 14 produces hydrogen gas on both sides.

Each electrode plate 13 and 14 is folded and edged in order to allow the gas bubbles formed at the sides of the plates 13 and 14 to flow freely in an upward direction through the electrolytic solution. As shown back in FIG. 1, after the gas bubbles break through the surface of the electrolytic solution, they eventually escape through the discharge portals or gas outlets 15 and 16 which lead to oxygen and hydrogen gas collector/consumers 28 and 29, respectively.

The decomposed water is replaced by water in the electrolytic solution from a supply source 30 which may contain a regulator 31 for controlling the feed of electrolytic solution to the housing 1 through inlet 40.

The folding and edging of each electrode plate 13 and 14 is preferred to be done on a standard metal crimping machine. Ideally, the folding and edging of the electrode plates 13 and 14 should be symmetrical.

Such symmetrical folding and edging of the electrode plates 13 and 14 allows a large gas production area to be compacted into a small volume of space.

According to Gauss's law which is one of the fundamental equations of electromagnetic theory, an excess electrical charge, if placed on an insulated conductor such as an electrode, resides entirely on its outer surface and, in particular, tends to concentrate on points and along sharp edges. See Halliday and Resnick, "Physics" at 594-608 (1st ed. 1965). Electrical charges flow as current with less ohmic resistance at such points and along such edges. Therefore, more points on and edges along an electrode cause easier and thus higher production of gases at the electrode surface than at the surface of a flat, substantially planar electrode plate.

The large surface area resulting from the folding and edging of the electrode plates 13 and 14 on both sides causes the oxygen and hydrogen molecules to disassociate more quickly from the aqueous bath and to be attracted to their respective positive and negative electrode plates 13 and 14. Because there is a great intensification of electrical charge along the edges, the release of the gas molecules from the electrode surfaces is of shorter duration then from flat or otherwise non-edged prior art electrode surfaces.

Such folding and edging on both sides of electrode plates 13 and 14 also eliminates the need for high concentrations of electrolyte because the negative oxygen ions and the positive hydrogen ions have to travel only a relatively short distance to the oppositely charged wall surfaces of their respective positive and negative electrode plates 13 and 14.

A plurality of these electrode plates 13 and 14 folded and edged on both sides are arrayed in parallel rows and are held very close to each other by thin electrode holders 20 shown in FIGS. 2 and 3. As best seen in FIG. 3, each electrode plate 13 and 14 would be positioned so that protruding edges of one wall on plate 13 would intermesh with recessed edges of an oppositely charged adjacent wall on plate 14. The distance between such intermeshed protruding and recessed edges could be as little as 0.5 millimeters which is approximately twice the diameter of an oxygen gas bubble. In prior art devices, such a short spacing between electrodes was not possible because the high voltages required therefor would result in arcing across, short-circuiting, and welding together of the electrodes.

For the present invention, the production of gases at the surfaces of the electrodes plates 13 and 14 is substantially instantaneous because of the small spacing between the electrode plates 13 and 14. Upward flow of the gases to the surface of the electrolytic solution is facilitated by the intermeshed protruding and recessed edges of the electrode plates 13 and 14 which edges act as channels for funneling the gases upwardly. In all known prior art devices, a prior of time for warm-up and pressurization of the electrolyte is required before any gases are produced. Such period of time for some prior art devices is usually two or more hours.

Also, in prior art devices, more electrolyte, e.g., 25-38% by weight in solution, is required to disassociate the ions from the water being decomposed and to carry the ions to the walls of the electrodes. The need for this much electrolyte requires a great flow of amperage which causes a large amount of waste heat to be produced. This heat has to be removed from the electrolysis apparatus. Such waste heat removal is usually carried out by heat exchangers, fans or coolant pumps.

In the present invention, because low wattage is utilized, the electrolysis operation is carried out at substantially room temperature. Thus, little waste heat is produced and there is no need for heat removal accessories, such as heat exchangers, fans, and coolant pumps.

As best shown in FIG. 2, a separator 21 is a microporous membrane made of polyvinyl chloride (PVC). Preferably, the separator 21 is symmetrically folded and edged. However, as shown from its top in FIG. 3, it may be planar. The membrane allows water to flow freely therethrough. Its main purpose is to keep the oxygen molecules from mixing with the hydrogen molecules after separation. A preferable material for the separator 21 is the Duramac diaphragm manufactured by W. R. Grace Co., Spartanburg, S.C. Other materials, such as asbestos or woven cloth, may also be suitable for use.

The separator 21 is about 0.002 inches thick and is contained between two thin separator holders 22 shown in the exploded view of FIG. 2 and in the top view of FIG. 3. Each separator 21 and its two holders 22 are fitted between two oppositely charged unipolar electrode plates 13 and 14.

Figure 4:
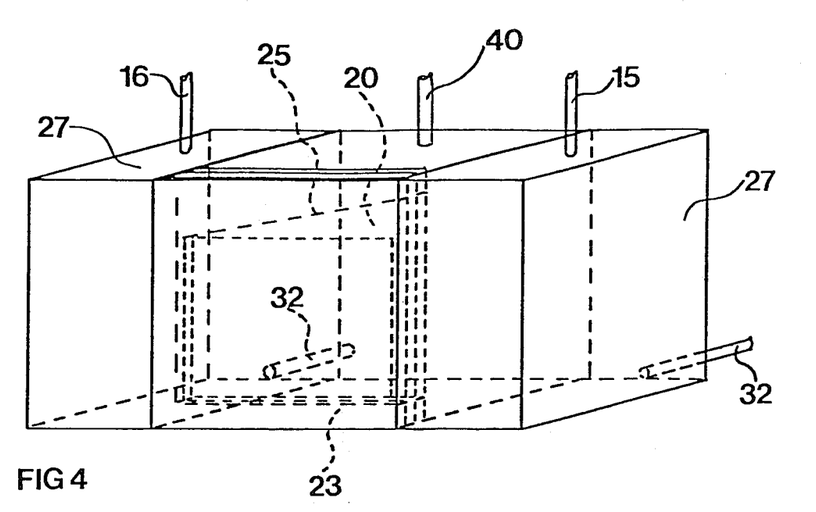
FIG. 4 is a partial schematic view of a second embodiment of the present invention for the simultaneous production of gas and minerals.
Figure 5:
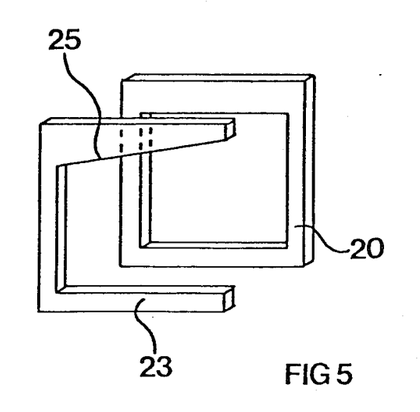
FIG. 5 is an exploded isometric view of an invertible plate arranged for the purpose of diverting the free upward flow of either hydrogen gas or oxygen gas laterally to separate outlets for the collection and/or consumption of the gases.
Figure 6:
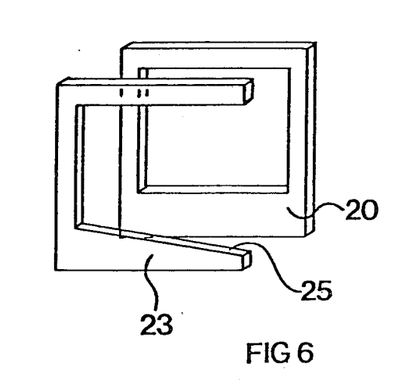
FIG. 6 is an exploded isometric view of the arrangement of the same plate shown in FIG. 5 inverted for the purpose of diverting the free downward fall of minerals laterally to the collection chambers shown in FIG. 4.

As shown in FIGS. 1 and 2, the end electrode holder 20 has an upwardly sloping ramp 24 for directing the free flow of gas to its appropriate outlet. In FIG. 1, ramp 24 is shown directing hydrogen gas to outlet 16. In the processing of sea or waste water for mineral extraction as seen in FIGS. 4-6, a diverter plate 23 is arranged next to the end electrode holder 20. In FIGS. 4 and 5, the diverter plate 23 has an upwardly sloping ramp 25 for directing the free flow of oxygen gas laterally to the top of a collection tank 27 to which the gas outlet 15 is connected. In FIG. 6, the diverter plate 23 is shown in its inverted position so that the ramp 25 is sloped downwardly in order to direct the free flow of minerals precipitating out of the water laterally to collection tank 27. Tests by independent chemical analysts, unaware of the source of the minerals, have determined that the minerals precipitated out of the sea water contain high concentrations of oxides of iron, magnesium, and sodium. Small concentrations of oxides of calcium, potassium, manganese, barium, copper, and zinc have also been obtained. Minute quantities of gold, lead, silver, and tin oxides have also been noted. The collection tanks 27 are arranged at the side of the housing 1 in order to avoid build-up of the minerals at the bottom of the electrode plates 13 and 14. Such build-up would cause shorting and corroding of the electrode plates 13 and 14 if the minerals were allowed to accumulate at the bottom thereof.

The minerals may be removed from the collection tanks 27 by lines 32, shown in FIG. 4, through which the minerals are drawn by a vacuum pump (not shown). No prior art device is known to the inventors for continuously producing hydrogen gas and oxygen gas while simultaneously precipitating out and extracting minerals from sea and waste water.

In those embodiments of the present invention in which only distilled or ordinary tap water is being decomposed, an electrolyte is necessary to aid the electrolysis process. The preferred electrolyte is potassium hydroxide (KOH). However, any conventional electrolyte, such as sodium hydroxide (NaOH), may be used. KOH is used in concentrations of only about 2.2% or less by weight of the electrolytic solution.

In unipolar prior art devices, 25-38% concentrations of the electrolyte by weight are needed. This is necessary to carry the current charge from the water being decomposed to the walls of the electrode plates because of the relatively large spacing between adjacent electrode plates. In bipolar prior art devices, concentrations of the electrolyte in the amount of 15-35% by weight are necessary. Because of such large spacing between adjacent electrode plates and also because the prior art devices require a high wattage to produce gases, production thereof can be achieved only by using such high concentrations of electrolyte.

Another advantage of the present invention is that the electrolyte is utilized at about room temperature. In all known prior art devices, the electrolyte is heated to various degrees above room temperature. Also, in some prior art devices, the heated electrolyte is injected under pressure. This injection under pressure causes the electrolyte to circulate around the electrode plates and to maintain uniformity of concentration. Such injection under pressure, forced circulation, and maintenance of concentration uniformity are not necessary for the electrolyte used in the present invention because of its low concentration. It follows that there is no need for any electrolyte in the present invention when sea or waste water is being decomposed because the salts therein are in a concentration sufficient to carry the ionic charge to the walls of the electrode plates.

Figure 7:
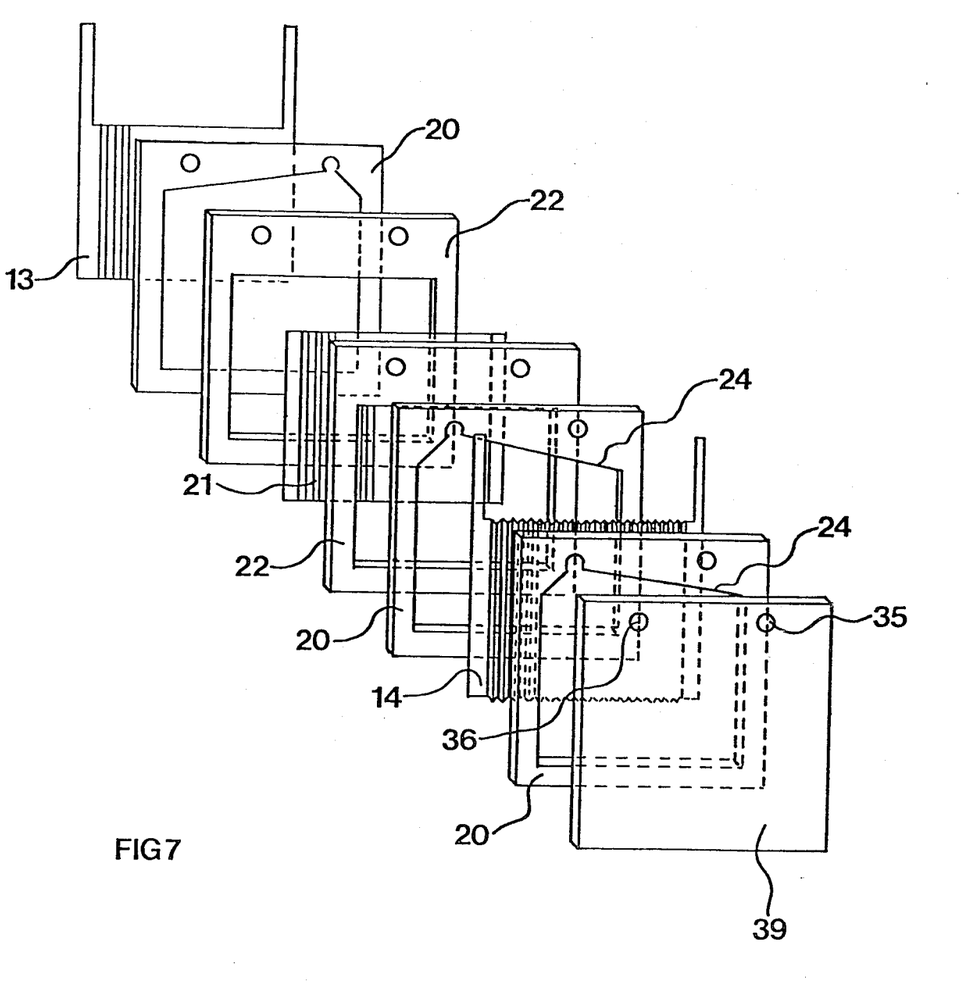
FIG. 7 is an exploded view of a third embodiment of an arrangement of symmetrically folded and edged positive and negative electrodes separated by a symmetrically folded and edged separator.
Figure 8:
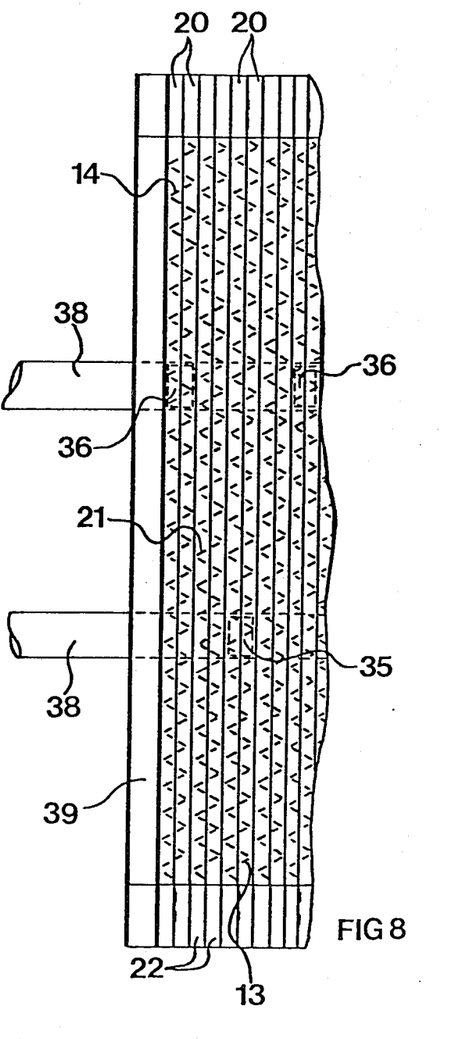
FIG. 8 is a top plan view of the third embodiment having an arrangement of a plurality of symmetrically folded and edged unipolar electrodes and a plurality of interspaced symmetrically folded and edged separators.
Figure 8A:
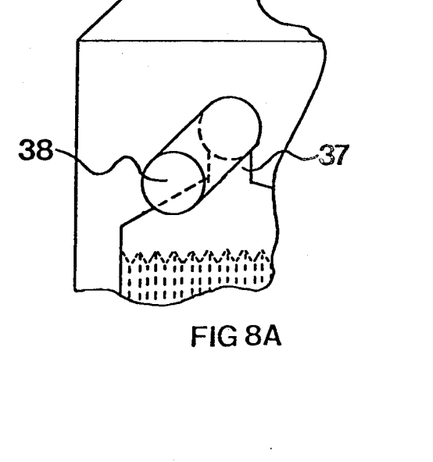
FIG. 8A is a magnified view of the outlet utilized in the third embodiment for the free upward flow of either hydrogen or oxygen gas.

In the third embodiment shown in the exploded view of FIG. 7 and the top plan view of FIG. 8, the oxygen gas flows through outlet 35 while hydrogen gas flows through outlet 36. These gas outlets 35 and 36 differ from the corresponding gas outlets 15 and 16 of the first embodiment shown in FIGS. 1-3 in that outlets 35 and 36 are holes aligned and drilled so as to carry a single pipe 38, shown in FIG. 8A, passing through all plates which comprise the electrolysis apparatus. This single pipe 38 is less cumbersome than the multiplicity of pipe fittings shown in FIG. 3 for the first embodiment. There is also less chance of gas leakage with pipe 38 than with the pipe fittings utilized for outlets 15 and 16 because there are less connections to be made for pipe 38. Pipe 38, as well as the fittings for outlets 15 and 16, may be made out of steel, brass, copper or any other suitable plumbing fixture material.

After the gases are produced at the walls of the electrode plates 13 and 14, they rise through the water and break through the surface thereof. The gases contact the upwardly sloping ramps 24 of the electrode holders 20 and are directed to the exits 37 shown in FIG. 8A. End plates 39 shown in FIG. 7 prevent the escape of the gases from the housing 1 except through the outlets 35 and 36. The gases pass through openings drilled in the underside of pipe 38 shown in FIGS. 8 and 8A and eventually flow to the respective collector/consumers 28 and 29 for oxygen and hydrogen.

Above the positive electrode plates 13, the oxygen gas flows through the outlet 35 shown in FIGS. 7 and 8 at a ratio of 2:1 to the hydrogen gas which is simultaneously produced at the negative electrode plate 14 and which flows through outlet 36. The gas flow at only slightly above atmospheric pressure because they are pushed along only by the gases that are being produced therebehind and that are breaking through the surface of the solution below. Thus, there is no need for external pressurization, as required in known prior art devices, either by internal pressurization of the electrolyte or by external vacuumization of the gases being produced.

Figure 9:
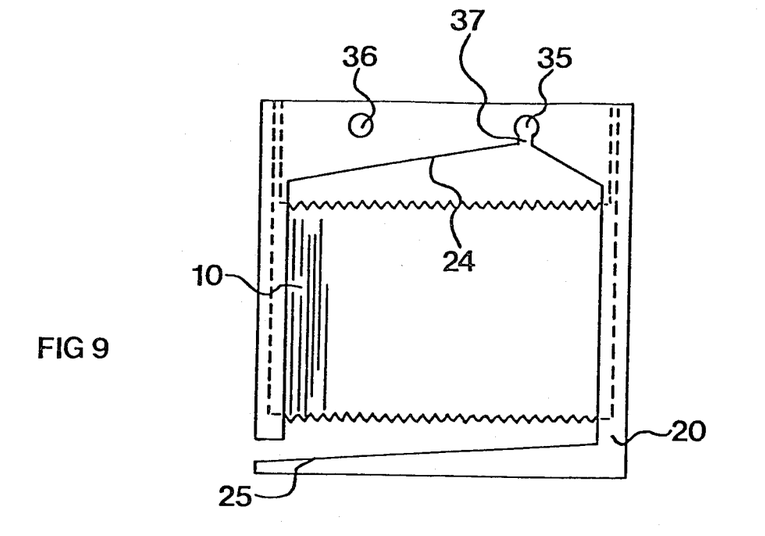
FIG. 9 is a partial front elevational view of a fourth embodiment of the present invention for the simultaneous production of gas and minerals.
Figure 10:
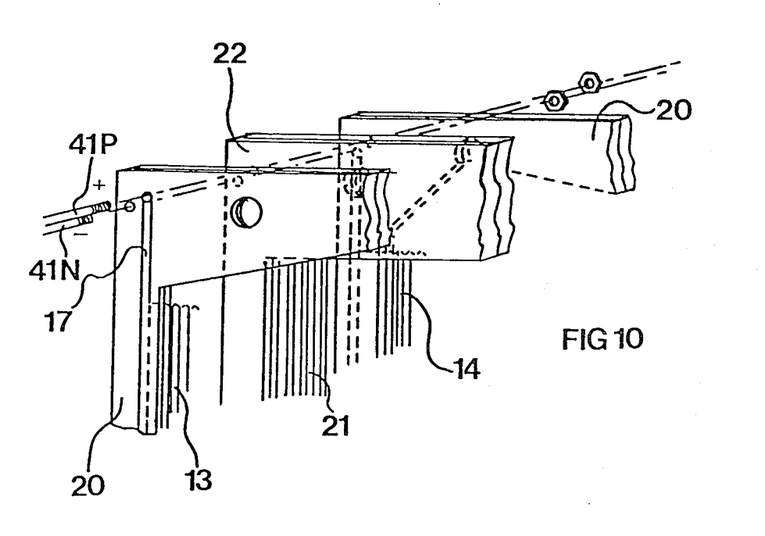
FIG. 10 is a partial exploded view of the electrical connection for the electrodes utilized in the third and fourth embodiments of the present invention.

The fourth embodiment shown in FIGS. 9 and 10 is similar to the second embodiment shown in FIGS. 4-6 for the electrolyzing of sea or waste water to produce hydrogen and oxygen gases and to precipitate out minerals. However, the fourth embodiment has the same arrangement of gas outlets 35 and 36 as the third embodiment rather than the arrangement of gas outlets 15 and 16 utilized in the second embodiment. Another difference between the second and fourth embodiments is that the fourth embodiment, as shown in the exploded view of FIG. 10, utilizes a single positively charged rod 41P, instead of a plurality of male-female connectors 11P shown in FIG. 1, for connecting the wires 9 outside the housing 1 to the tabs 17 of the positive electrode plates 13. Likewise, a single negatively charged connector rod 41N, instead of a plurality of male-female connectors 11N, is used for connecting the wires 9 outside the housing 1 to the tabs 17 of the negative electrode plates 14. There is a pair of connector rods 41N and 41P which pass through the upper corners on each side of all plates comprising the production unit. However, in order to avoid electrical interference, they are offset from each other. Likewise, the tabs 17 for the positive and negative electrodes plates 13 and 14 must be offset from each other and lengthened or shortened appropriately to make contact with the corresponding connector rod 41P and 41N, respectively.

Utilizing the first and second embodiments shown in FIGS. 1-6, the operation of the invention will be briefly described. Initially, water to be decomposed is supplied to the production housing 1 from a supply source 30 containing the KOH electrolyte through the regulator 31 which controls the feed of the solution through the plurality of inlets 40. Each inlet 40 feeds the solution to a group of three electrodes shown in FIG. 3. Alternatively, there may be a single inlet 40, as shown in FIG. 4. In both arrangements, the regulator 31 meters the inflow of the electrolytic aqueous solution in correspondence to the outflow of gases so that the solution level in the housing 1 remains substantially the same.

The direct current power source 4 is then turned on to supply electricity to the housing 1. Positive electrons flow through cable 5 to the positive side 6 of bus bar 2 which distributes the electrical wattage through wires 9 and connectors 11P to tabs 17 of positive electrode plates 13. Likewise, negative electrons flow through cable 7 to the negative side 8 of bus bar 2 which also distributes the electrical wattage through wires 9 and connectors 11N to tabs 17 of negative electrode plates 14.

The electrical charge is intensified along the sharp points and edges of the symmetrically folded electrode plates 13 and 14 so much that the water ($H_2O$) molecules in the electrolytic solution disassociate into positive hydrogen ($H^+$) and negative oxygen ($O^-$) ions. Because of the small spacing between the plates 13 and 14, the positive hydrogen ions are very quickly attracted to the negative electrode plates 14 while the negative oxygen ions are simultaneously attracted to the positive electrode plates 13. The ions flow upwardly along the walls of the plates 13 and 14 in the channels formed between the protruding and recessed edges of the adjacent plates 13 and 14. Before breaking through the surface of the electrolytic solution, the positive hydrogen ions join with other positive hydrogen ions to form hydrogen ($H_2$) molecules and gas bubbles. Likewise, the negative oxygen ions join with other negative oxygen ions to form oxygen ($O_2$) molecules and gas bubbles. These gas bubbles break the surface of the electrolytic solution and rise upwardly until they contact the sloping ramp 24 of the electrode holder 20 shown in FIG. 1 or the sloping ramp 25 of the diverter plate 23 as shown in FIG. 4. These ramps 24 and 25 direct the oxygen gas molecules to the outlets 15 and the hydrogen gas molecules to the outlets 16. The outlets 15 and 16 direct the gases to collector/consumers 28 and 29 for oxygen and hydrogen, respectively, Simultaneously, minerals are precipitated out of any sea or waste water being processed and are directed by ramps 25 of diverter plates 23 to collection tanks 27 at both sides of housing 1. The minerals are then removed through lines 32 for further processing.

In all four embodiments, after the gases flow through the outlets 15 and 16 or 35 and 36, they reach the collector/consumers 28 and 29 which schematically represent storage containers and operating devices. For certain further operations, the gases may have any remaining water vapor removed therefrom by conventional drying techniques. Such operating devices may be gas heaters, transportation vehicles, welding equipment, coolers, stationary engines, batteries, or chemical processors. The gas heaters may be residential, commercial, industrial, or any other type of burner which could be used for cooking, baking, etc. The transportation vehicles could be private automobiles, commercial trucks, buses, marine vessels, or aircraft. The coolers could be air conditioners or refrigerators. The stationary engines could be generators or the like. The chemical processors could be those utilized for annealing metals, making fertilizers, producing methane gas, generating ammonia, manufacturing glass, and a myriad of other applications.

The theoretical power required to produce hydrogen gas and oxygen gas from liquid water is 79 kilowatts per 1,000 cubic feet of hydrogen gas. See "Hydrogen," Van Nostrand's Scientific Americana 1313 (1979). In the present invention, the actual power required to produce hydrogen gas and oxygen gas from liquid water is about 85 kilowatts per 1,000 cubic feet of hydrogen gas. This figure compares favorably with other known prior art devices. For example, one such highly touted device is manufactured by Teledyne Energy Systems Inc., Timonium, Md., and has an actual power requirement of 155 kilowatts per 1,000 cubic feet of hydrogen gas.

The theoretical electrical efficiency of an electrolysis apparatus approaches a maximum of nearly 120% according to Van Nostrand, supra. However, in practice, such devices have an overall efficiency of only about 30% when the losses associated with the electricity utilized in the production of the gases are considered. See "Groundwork for a hydrogen-fueled economy," Business Week, Sept. 4, 1978. The overall electrical efficiency of the present invention is over 90%. One of the main reasons for obtaining such a high efficiency is that there is no need for most auxiliary equipment generally required for the production of the gases by known prior art devices.

The purity required for the hydrogen and oxygen gases varies with the use to which the gas is to be put. For example, commercially marketable hydrogen and oxygen bottled gases are usually at least 99.97% pure. Tests have shown the present invention to produce 99.0 to 99.5% pure oxygen and 99.93-99.99% pure hydrogen. The application of conventional drying techniques to the gases after production and before bottling should bring them up to the desired level of purity.

These embodiments of the present invention are considered to be illustrative only since other modifications will be readily discerned by those skilled in the pertinent technology. In any event, the scope of the invention is intended to be covered by both the letter and the spirit of the claims appended hereto.

We claim:

1. In the method of commercially producing hydrogen and oxygen by the electrolysis of water, the improvement which comprises the steps of providing an electrolytic apparatus, feeding sea water directly into the apparatus without prior distillation thereof, collecting the hydrogen and oxygen produced, simultaneously precipitating out minerals from the water, and subsequently extracting the minerals from the apparatus.

2. In the method of commercially producing hydrogen and oxygen by the electrolysis of water of claim 1, further including the step of providing a unipolar electrolytic apparatus having a solution containing KOH, wherein the KOH concentration by weight is approximately 2.2%.

3. In the method of commercially producing hydrogen and oxygen by the electrolysis of water, the improvement which comprises the steps of providing an electrolytic apparatus having a plurality of unipolar electrodes made from non-precious metals, electrically connecting the electrodes in parallel, supplying a voltage in the range of 1.9 to 2.6 volts to the parallel connected electrodes, and operating the apparatus at ordinary temperatures without the necessity for external cooling thereof.

4. In the method of commercially producing hydrogen and oxygen by the electrolysis of water, the improvement which comprises the steps of providing an electrolytic apparatus having a plurality of unipolar electrodes made from non-precious metals, electrically connecting the electrodes in parallel, supplying a voltage of approximately 2 volts to the parallel connected electrodes, and operating the apparatus at ordinary temperatures without the necessity for external cooling thereof.

5. In the method of commercially producing hydrogen and oxygen by the electrolysis of water, the improvement which comprises the steps of providing an electrolytic apparatus having a plurality of unipolar electrodes made from non-precious metals, electrically connecting the electrodes in parallel, supplying a relatively low voltage to the parallel connected electrodes, wherein the wattage applied per electrical field is approximately 8 watts, and operating the apparatus at ordinary temperatures without the necessity for external cooling thereof.

6. In the method of commercially producing hydrogen and oxygen by the electrolysis of water, the improvement which comprises the steps of providing an electrolytic apparatus having a plurality of unipolar electrodes made from non-precious metals, electrically connecting the electrodes in parallel, supplying a relatively low voltage to the parallel electrodes, operating the apparatus at ordinary temperatures without the necessity for external cooling thereof, supplying sea or waste water to the apparatus without the necessity for prior distillation thereof, and simultaneously precipitating out minerals therefrom.

7. In the method of commercially producing hydrogen and oxygen by the electrolysis of water, the improvement which comprises the steps of providing an electrolytic apparatus having an anode and a cathode which are symmetrically folded and sharply edged, feeding sea water directly into the apparatus without prior distillation thereof, collecting the hydrogen and oxygen produced, and simultaneously precipitating out minerals from the water.

8. In the method of producing hydrogen and oxygen by the electrolysis of water, the improvement which comprises the steps of providing an electrolytic apparatus having a solution containing an hydroxide which has a relatively low concentration by weight, the apparatus including a plurality of cells each having an anode and a cathode, each of which is formed from a non-precious metal, electrically connecting the cells in parallel, feeding current to the parallel electrically connected cells, and operating the apparatus at approximately atmospheric pressure and room temperature without the necessity for external cooling thereof, and without the necessity for external cooling thereof, and without the necessity for initial purging of the apparatus by an inert gas.

9. The improvement of claim 8, wherein the hydroxide is selected from the group consisting of potassium and sodium.

10. In the method of commercially producing hydrogen and oxygen by the electrolysis of water, the improvement which comprises the steps of providing an electrolytic apparatus having a plurality of unipolar electrodes made from non-precious metals, electrically connecting the electrodes in parallel, supplying a relatively low voltage to the parallel connected electrodes, and operating the apparatus at ordinary temperatures without the necessity for external cooling thereof.

11. In the method of commercially producing hydrogen and oxygen by the dissassociation of water, the improvement which comprises the steps of providing an electrolytic apparatus having a plurality of unipolar electrodes made from non-precious metals and further having a solution containing KOH in a concentration which is approximately 2.2% by weight, electrically connecting the electrodes in parallel, supplying a voltage of approximately 2 volts to the parallel electrodes, supplying water to the apparatus without prior distillation thereof, operating the apparatus at ordinary temperatures without the necessity for external cooling thereof, collecting the hydrogen and oxygen produced, and simultaneously precipitating out minerals for subsequent extraction from the apparatus.

12. The improvement of claim 11, wherein the electrodes are folded and edged.

13. The improvement of claim 12, wherein the electrodes are symmetrically folded and sharply edged.

* * * * *